Jan. 28, 1958     N. E. KERRIDGE     2,821,079
APPARATUS FOR MEASURING THE CONSISTENCY
DURING MIXING OF CONCRETE
Filed May 16, 1955     4 Sheets-Sheet 4
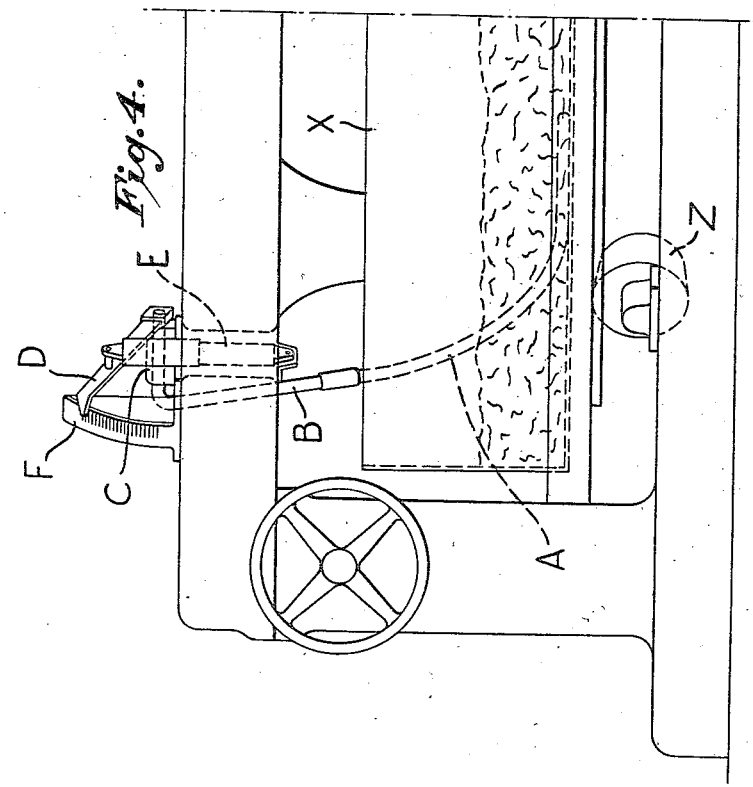
Inventor:
Norman Edward Kerridge
By his attorneys:
Baldwin + Wight United States Patent Office 2,821,079
Patented Jan. 28, 1958

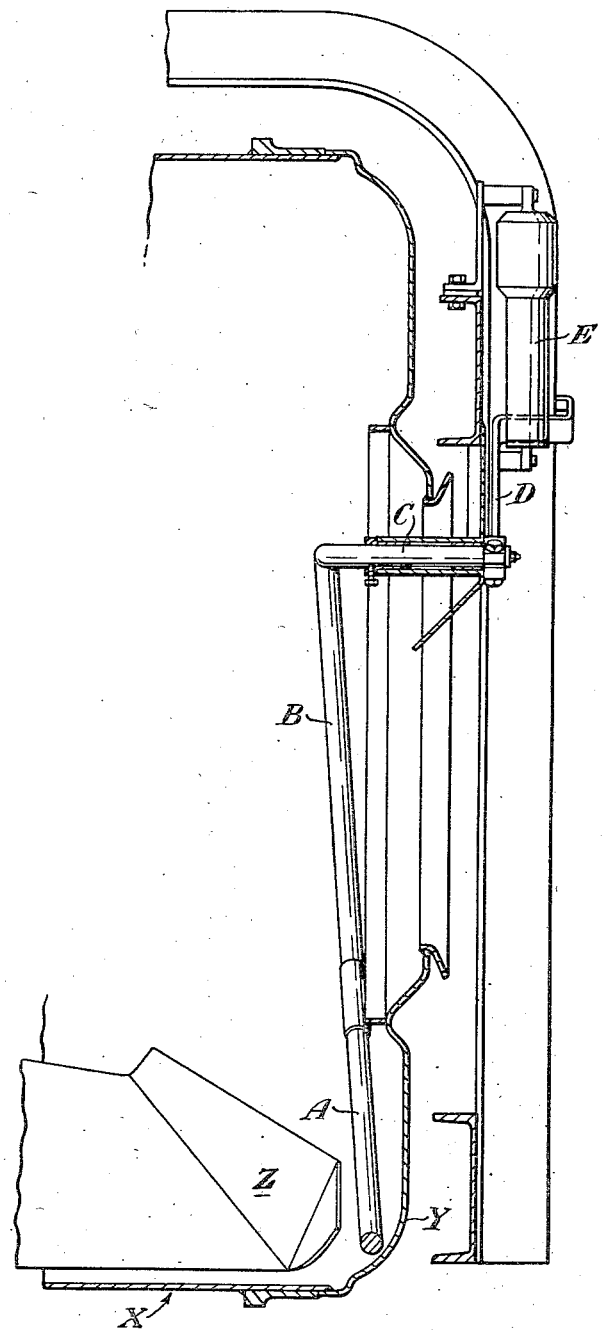

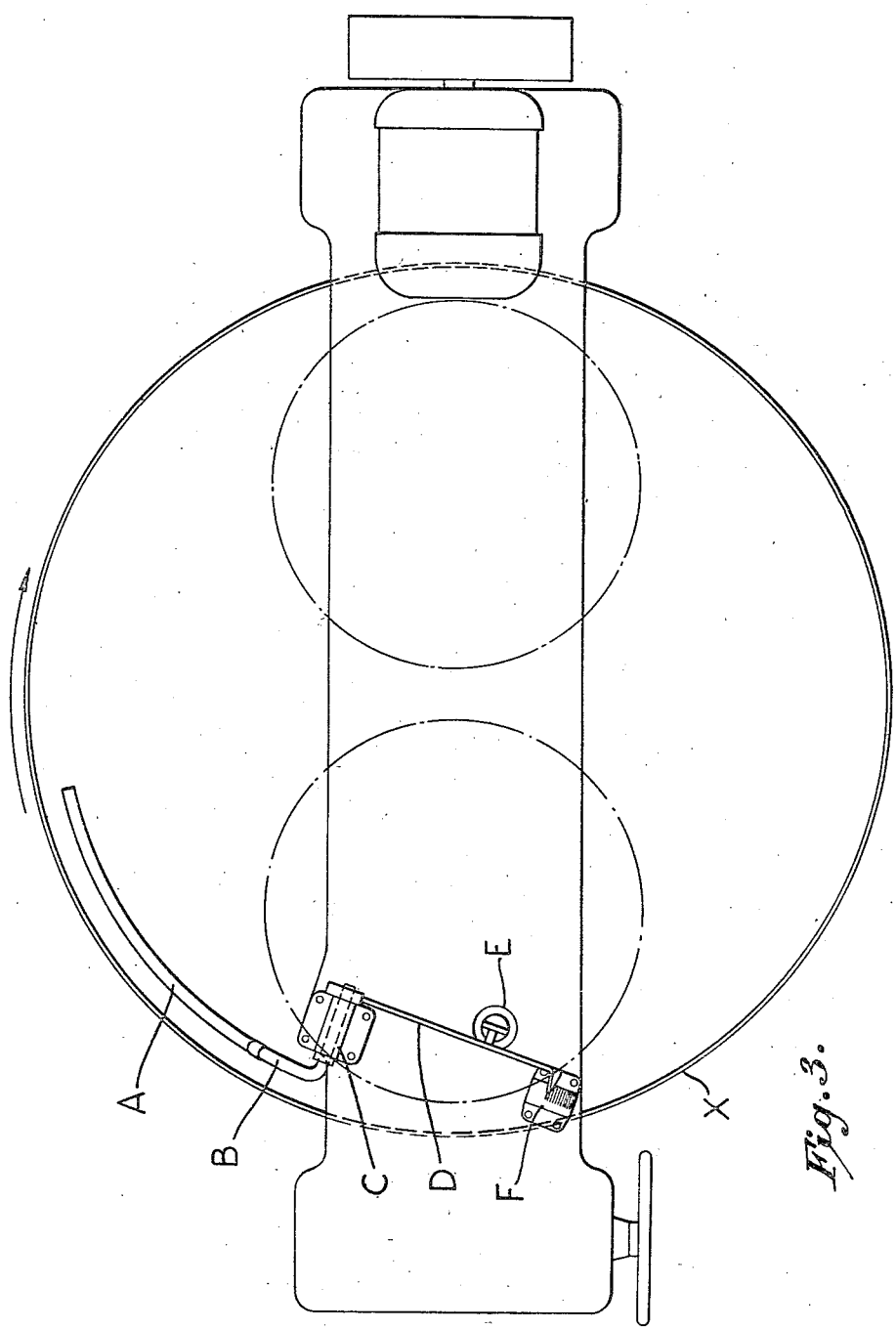

2,821,079

APPARATUS FOR MEASURING THE CONSISTENCY DURING MIXING OF CONCRETE

Norman Edward Kerridge, Saltford, near Bristol, England, assignor to Stothert & Pitt Limited, Bath, England, a British company Application May 16, 1955, Serial No. 508,574

5 Claims. (Cl. 73—54)

This invention relates to the mixing of concrete and the like and comprises a device for measuring or recording the consistency of the mix and, in particular, mixing apparatus fitted with such a device.

The consistency of concrete depends upon the proportions of aggregates, cement and water used, and although it is usual in the preparation of high grade concrete to weigh the various aggregates and the cement, and to weigh or measure volumetrically the water, it is very difficult, as anyone who has had experience of concrete mixing will recognize, to obtain the correct consistency of the concrete mix. This is due to the variable quantity of water present in the aggregates, particularly the fine aggregate or sand, unless these are dried before hand, which is a very expensive operation. Similar considerations apply to like material such as mortar.

According to the present invention a device for measuring consistency of concrete or the like comprises a flexible element which is suspendable in the concrete or the like so that there is relative motion between the two, and means for indicating the drag on the element due to the relative motion.

The flexible element of the device is preferably a length of rubber strip which may be termed a "rat's tail" which is trailed in the mix so that there is relative motion between the two. The friction between the mix and the trailing element creates a drag which varies according to the consistency of the mix and this drag may be measured by attaching the element to a spring loaded biasing lever so that the drag acts against the spring and moves the lever.

The esesential feature is that the element should be so suspended in the mix that there is relative motion between the two—the more uniform this motion is the more steady will be the drag reading.

In the case of mixers in which the container rotates, e. g. drum or pan mixers, that part of the mix adjacent the walls of the container tends to be carried round therewith and it is preferred therefore to mount the device on such mixers so that the element trails in the mix adjacent the walls where the motion of the mix is steadiest and possibly highest. The device will of course be mounted on a stationary part of the mixer in a position convenient for the operator.

The device may also be fitted to a pan mixer in which wheels or rollers revolve round the pan. In this case the device would be mounted on the revolving part so that the element trails behind in the mix.

The device may also be used for checking the consistency of mixes during transference from one point to another for example when pumping or pouring.

The invention is illustrated in the accompanying drawings in which:

Figures 1 and 2 illustrate the application of the invention to the drum of a rotary concrete mixing machine, Figure 1 being a side elevation and Figure 2 a part vertical section of the drum fitted with a measuring device of this invention.

Figures 3 and 4 illustrate the invention as applied to a pan mixer i. e., a mixer in which the pan revolves about a vertical axis, Figure 3 being a plan view and Figure 4 being a part side elevation.

Figure 1:
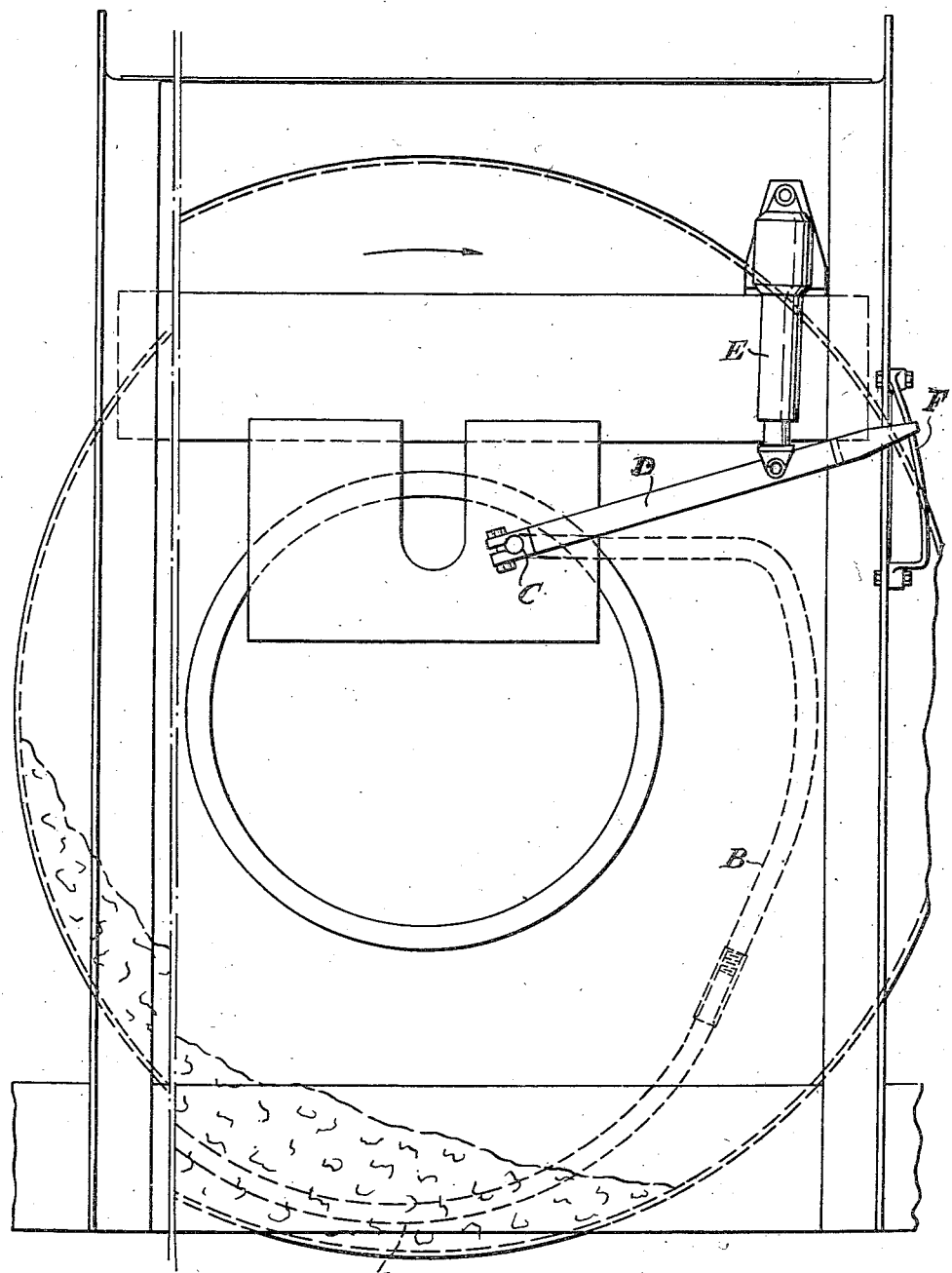

In the drawing X represents the mixer drum, Y the entrance end of the mixer drum, and Z one of the mixer buckets. A represents the rat's tail, which is made of rubber, and B is a lever to which the rat's tail is secured. The lever is fulcrumed at the bearing C attached to the mixer frame, and secured to the other end of the lever spindle is a lever D to which is attached a spring loaded dashpot E, the other end of which is fixed to the mixer frame. As is clear from the showing of the rat's tail element A as having a substantial part of its length submerged in and surrounded by the slurry mix, the specific gravity of the element is such that it sinks into the mix.

Lever D terminates in a pointer which registers the consistency of the concrete on the graduated scale F, in degrees, scale F being divided from 0° to 20°, 0° being at the top, the position of the pointer as shown on the drawing.

The position of the rat's tail is between the mixer drum end Y and the buckets Z, and as the mixer drum rotates it creates a relative motion between the concrete lying in the drum and the rat's tail. This relative motion pulls the rat's tail, due to skin friction between the concrete and the rubber.

The extent of this skin friction varies according to the consistency of the concrete, i. e. as the water content of the concrete being mixed is increased, the tension in the rat's tail is decreased.

The pull on the rat's tail is transmitted through lever B which pivots in bearing C to lever D, and is restricted by means of a biasing spring contained in dashpot E, so the position of the pointer of lever D on the scale F is determined by the lever reaching such a position that the load on the spring in E counterbalances the pull of the rat's tail A.

Referring now to Figures 3 and 4 the mixing pan is shown at X, the pan being mounted to revolve on rollers Z. "A" represents the rat's tail of rubber or other flexible material which is attached at one end of a lever B. The lever is fulcrumed at a bearing C, which is mounted on a stationary part of the mixer frame, and is spring-loaded by means of a spring-loaded dashpot E connected between the lever and the mixer frame.

Lever D terminates in a pointer which indicates the drag on the rat's tail and therefore the consistency of the mix on a graduated scale F.

The device is so mounted that the rat's tail trails in the mix close to the wall of the pan X.

In an alternative arrangement which is applicable to either of the embodiments described above the rat's tail A is attached to the lever B through two chain links so as to allow the tail to flex more freely at this point.

Additionally the spring-loaded dashpot may be replaced by a tension spring connected between the lever and the frame of the mixer, or, instead of being spring-loaded, the lever may be weighted and so disposed that the weight is lifted by the drag on the rat's tail.

In each of the disclosed embodiments of the invention the operative portion of the flexible element A is that part which is immersed in the slurry. As is shown in Figures 1 and 4, at least a portion of the submerged length of each of the elements A is substantially parallel to the path of movement of the slurry, but no portion of the immersed length of either of the elements A is normal to the path of movement of the slurry. This arrangement assures that the reading obtained from the scale will be purely a function of the skin friction between the slurry and the elements A.

What is claimed is:

1. The combination with a slurry mixing container mounted on a stationary frame for revolving movement, of apparatus for measuring the consistency of the slurry, said apparatus comprising an elongate flexible element positioned adjacent to the perimeter of the container and extending into the container and having a specific gravity such as to sink into slurry the consistency of which is to be measured so as to be submerged in the slurry throughout a substantial part of the length of said element whereby relative movement between said submerged part of said element and the slurry surrounding said submerged part will induce drag on said element; and means for biasing said element against being moved by the drag of the slurry on the submerged part of said element and for indicating the consistency of the slurry comprising a movable pointer, and means connecting said element to said pointer for actuating the latter in response to the inducement of drag on the element.

2. The combination with a slurry mixing container mounted on a stationary frame for revolving movement, of apparatus for measuring the consistency of the slurry, said apparatus comprising an elongate flexible element positioned adjacent to the perimeter of the container and extending into said container and having a specific gravity such as to sink into slurry the consistency of which is to be measured so as to be submerged in the slurry throughout a substantial part of the length of said element whereby relative movement between said submerged part of said element and the slurry surrounding said submerged part will induce drag on said element, said element having no portion of its submerged length normal to the path of movement of the slurry; and means for biasing said element against being moved by the drag of the slurry on the submerged part of said element and for indicating the consistency of the slurry comprising a movable pointer, and means connecting said element to said pointer for actuating the latter in response to the inducement of drag on the element.

3. The combination with a slurry mixing container mounted on a stationary frame for revolving movement, of apparatus for measuring the consistency of the slurry, said apparatus comprising an elongate flexible element positioned adjacent to the perimeter of the container and extending into said container and having a specific gravity such as to sink into slurry the consistency of which is to be measured so as to be submerged in the slurry throughout a substantial part of the length of said element whereby relative movement between said submerged part of said element and the slurry surrounding said submerged part will induce drag on said element, said element having at least a portion of its submerged length substantially parallel to the path of movement of the slurry; and means for biasing said element against being moved by the drag of the slurry on the submerged part of said element and for indicating the consistency of the slurry comprising a movable pointer, and means connecting said element to said pointer for actuating the latter in response to the inducement of drag on the element.

4. The combination with a slurry mixing container mounted on a stationary frame for revolving movement, of apparatus for measuring the consistency of the slurry, said apparatus comprising an elongate flexible element positioned adjacent to the perimeter of the container and extending into said container and having a specific gravity such as to sink into slurry the consistency of which is to be measured so as to be submerged in the slurry throughout a substantial part of the length of said element whereby relative movement between said submerged part of said element and the slurry surrounding said submerged part will induce drag on said element, said element having at least a portion of its submerged length substantially parallel to the path of movement of the slurry but having no portion of its submerged length normal to the path of movement of the slurry, and means for biasing said element against being moved by the drag of the slurry on the submerged part of said element and for indicating the consistency of the slurry comprising a movable pointer, and means connecting said element to said pointer for actuating the latter in response to the inducement of drag on the element.

5. The combination with a slurry mixing container mounted on a stationary frame for revolving movement, of apparatus for measuring the consistency of the slurry, said apparatus comprising an elongate flexible element positioned adjacent to the perimeter of the container and extending into said container and having a specific gravity such as to sink into slurry the consistency of which is to be measured so as to be submerged in the slurry throughout a substantial part of the length of said element whereby relative movement between said submerged part of said element and the slurry surrounding said submerged part will induce drag on said element, said element having at least a portion of its submerged length substantially parallel to the path of movement of the slurry but having no portion of its submerged length normal to the path of movement of the slurry; and means for biasing said element against being moved by the drag of the slurry on the submerged part of said element and for indicating the consistency of the slurry comprising a movable pointer, means connecting said element to said pointer for actuating the latter in response to the inducement of drag on the element, and a dash pot connected to said pointer for exerting a damping influence on said pointer.

References Cited in the file of this patent

UNITED STATES PATENTS

| | | |
|---|---|---|
| 1,201,402 | Webb | Oct. 17, 1916 |
| 1,730,893 | Lichtenberg | Oct. 8, 1929 |
| 1,770,589 | Cram | July 15, 1930 |
| 2,409,014 | Bohmer et al. | Oct. 8, 1946 |
| 2,629,790 | Laing et al. | Feb. 24, 1953 |